United States Patent
Radhakrishnan et al.

(10) Patent No.: US 7,065,077 B1
(45) Date of Patent: Jun. 20, 2006

(54) FRAME RELAY OVER POINT TO MULTIPOINT LINKS

(75) Inventors: Ramesh Radhakrishnan, Saratoga, CA (US); Keyvan Moataghed, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 904 days.

(21) Appl. No.: 09/721,369

(22) Filed: Nov. 22, 2000

(51) Int. Cl.
*H04L 12/28* (2006.01)
*H04L 12/56* (2006.01)

(52) U.S. Cl. ..................................... 370/389; 370/469
(58) Field of Classification Search ............... 370/389, 370/352, 465, 236.2, 238, 338, 395.31, 397, 370/466, 469, 493; 379/93.2; 709/201, 709/238

See application file for complete search history.

(56) References Cited

U.S. PATENT DOCUMENTS

| | | | |
|---|---|---|---|
| 5,550,816 A * | 8/1996 | Hardwick et al. .......... 370/397 |
| 5,936,949 A * | 8/1999 | Pasternak et al. ........... 370/328 |
| 6,023,467 A * | 2/2000 | Abdelhamid et al. .... 370/236.2 |
| 6,226,260 B1 * | 5/2001 | McDysan .................... 370/216 |
| 6,324,267 B1 * | 11/2001 | Hraster et al. ............ 379/93.02 |
| 6,339,594 B1 * | 1/2002 | Civanlar et al. ............. 370/352 |
| 6,466,985 B1 * | 10/2002 | Goyal et al. ................. 709/238 |
| 6,483,852 B1 * | 11/2002 | Jacquet et al. .............. 370/466 |
| 6,522,641 B1 * | 2/2003 | Siu et al. ..................... 370/338 |
| 6,577,642 B1 * | 6/2003 | Fijolek et al. .............. 370/465 |
| 6,594,280 B1 * | 7/2003 | Chapman .................... 370/469 |
| 6,631,136 B1 * | 10/2003 | Chowdhury et al. ... 370/395.31 |
| 6,671,260 B1 * | 12/2003 | Engstrand .................... 370/238 |
| 6,731,639 B1 * | 5/2004 | Ors et al. ............. 370/395.51 |
| 6,735,172 B1 * | 5/2004 | Gibbs et al. ................. 370/235 |
| 6,742,031 B1 * | 5/2004 | Fontenot ...................... 709/224 |
| 6,765,931 B1 * | 7/2004 | Rabenko et al. ............ 370/493 |
| 6,798,785 B1 * | 9/2004 | Sasson et al. ............... 370/466 |

OTHER PUBLICATIONS

"Frame Relay Networking", Frame Relay Forum, Fremont, CA; www.frforum.com.
"Radio Frequency Interface Specification", Interim Specification 1999, 2000 Cable Television Laboratories, Inc.

* cited by examiner

*Primary Examiner*—Brian Nguyen
(74) *Attorney, Agent, or Firm*—Cindy Kaplan (57) ABSTRACT

Frame Relay connectivity is provided via point to multipoint networks. Frame Relay access can thus be readily provided via point to multipoint networks such as data over cable networks and wireless networks. The end user obtains Frame Relay quality-of-service features via the point to multipoint network. The network service provider gains an additional method of access to the Frame Relay wide area network (WAN). Frame Relay quality of service information is translated into parameters appropriate for use with point to multipoint protocols so that point to multipoint network bandwidth may be properly measured.

38 Claims, 6 Drawing Sheets

FRAME RELAY OVER POINT TO MULTIPOINT LINKS

BACKGROUND OF INVENTION

The present invention relates to data communication networks and more particularly to systems and methods for adapting Frame Relay networking techniques to new physical layer access technologies.

Frame Relay is a packet-based scheme for implementing a wide area network (WAN). Frame Relay information is divided into packets or frames. Frame Relay packets travel through a series of Frame Relay switches between a source node and a destination node. Frame Relay employs a very simple routing scheme. Packets are sent via a virtual circuit between the origin and destination. All packets of the same virtual circuit follow the same preconfigured route through a Frame Relay network.

Although Frame Relay lacks the flexibility inherent in Internet Protocol (IP) based routing schemes, it is relatively simple to implement and also provides many qualities of service features. Furthermore, because Frame Relay packets may encapsulate IP packets, Frame Relay may be used to support IP-based applications such as web access and e-mail.

Typical Frame Relay networks use point to point links to implement network connections both between intermediate nodes and to provide access to users at the network edges. These point to point links are often T-1 or T-3 connections.

Increasingly, however, broadband access is provided to businesses and residences by the use of point to multipoint networks where a central access node communicates with many subscriber nodes via a shared transmission medium. One example of such a point to multipoint network is a data over cable network where numerous cable modems exchange data with a head end. Another example of a point to multipoint network is a broadband wireless access network where numerous subscriber radios exchange data with a central access point.

It would be desirable to provide Frame Relay services to users of such point to multipoint networks. One could then obtain easier access to the existing Frame Relay infrastructure and the services provided thereon. Unfortunately, Frame Relay packets cannot traverse point to multipoint networks as they are currently configured. What is needed are systems and methods for adapting Frame Relay services to point to multipoint networks and providing Frame Relay connectivity via such networks.

SUMMARY OF INVENTION

Frame Relay connectivity is provided via point to multipoint networks by virtue of one embodiment of the present invention. Frame Relay access can thus be readily provided via point to multipoint networks such as data over cable networks and wireless networks. The end user obtains Frame Relay quality-of-service features via the point to multipoint network. The network service provider gains an additional method of access to the Frame Relay wide area network (WAN). In one embodiment, Frame Relay quality of service information is translated into parameters appropriate for use with point to multipoint protocols so that point to multipoint network bandwidth is properly managed.

According to one aspect of the present invention, a method providing Frame Relay services via a multipoint network includes: receiving a point to multipoint protocol packet at a central access node of the point to multipoint network, extracting a Frame Relay packet from the point to multipoint protocol packet at the central access node, and forwarding the Frame Relay packet via a Frame Relay network.

A further understanding of the nature and advantages of the invention herein may be realized by reference to the remaining portions of the specification and the attached drawings.

DESCRIPTION OF SPECIFIC EMBODIMENTS

Figure 1:
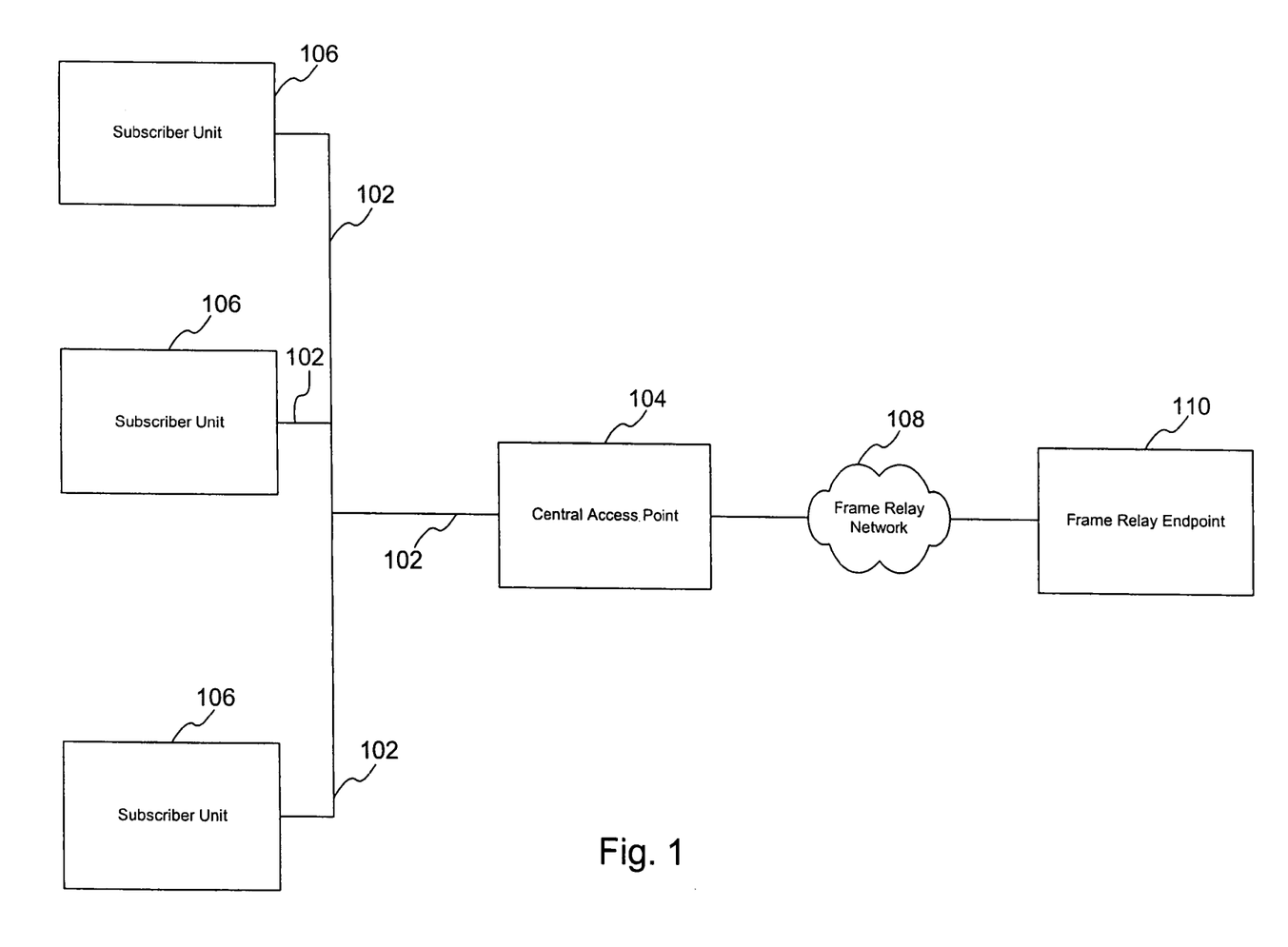
FIG. 1 depicts a point to multipoint network connected to a Frame Relay network according to one embodiment of the present of the present invention.

One embodiment of the present invention provides Frame Relay services via a point to multipoint network. The point to multipoint network can provide the network user so-called "last mile" access for Frame Relay services. FIG. 1 depicts a network architecture for providing Frame Relay services in this way. A point to multipoint network 102 interconnects a central access point 104 and multiple subscriber units 106. One exemplary implementation of point to multipoint network 102 would be a data over cable network where central access point 104 is equipped with a data over cable head end and each of subscriber units 106 exploits a cable modem.

Point to multipoint network 102 is implemented in the physical layer by a shared transmission medium, e.g., coaxial cable. Point to multipoint network 102 may then, e.g., operate in accordance with a point to multipoint protocol such as the DOCSIS 1.0 specifications or DOCSIS 1.1 specifications published by Cable Television Laboratories, Inc. of Louisville, Colo. The entire contents of these DOCSIS specifications are incorporated herein by reference for all purposes.

Another implementation of point to multipoint network 102 is a wireless network. In one such implementation, the media access control (MAC) layer is handled according to the DOCSIS protocol while the physical layer uses an OFDM-based modulation technique. One example of an OFDM modulation technique is VOFDM, a wireless communication standard maintained by the Broadband Wireless Internet Forum (BWIF).

A central access point 104 interfaces between point to multipoint network 102 and a Frame Relay network 108. Frame Relay network 108 operates according to Frame Relay protocols as established by the Frame Relay Forum of Fremont, Calif. and the International Telecommunications Union (ITU) of Geneva, Switzerland. Specifications describing Frame Relay operation include the FRF 1.2 User to Network Implementation Agreement (available from the Frame Relay Forum); ITU Recommendations Q.922 and Q.933 (available from the ITU). All of these documents are incorporated herein by reference in their entirety for all purposes.

Data travels via Frame Relay network 108 between central access point 104 and many possible destination nodes at the edges of Frame Relay network 108. One example of such a destination is shown, a Frame Relay end point 110. Traffic through Frame Relay network 108 travels via intermediate nodes known as Frame Relay switches. According to the present invention, Frame Relay services are provided to subscriber units 106. Subscriber units 106 can effectively act as a part of Frame Relay network 108.

Figure 2:
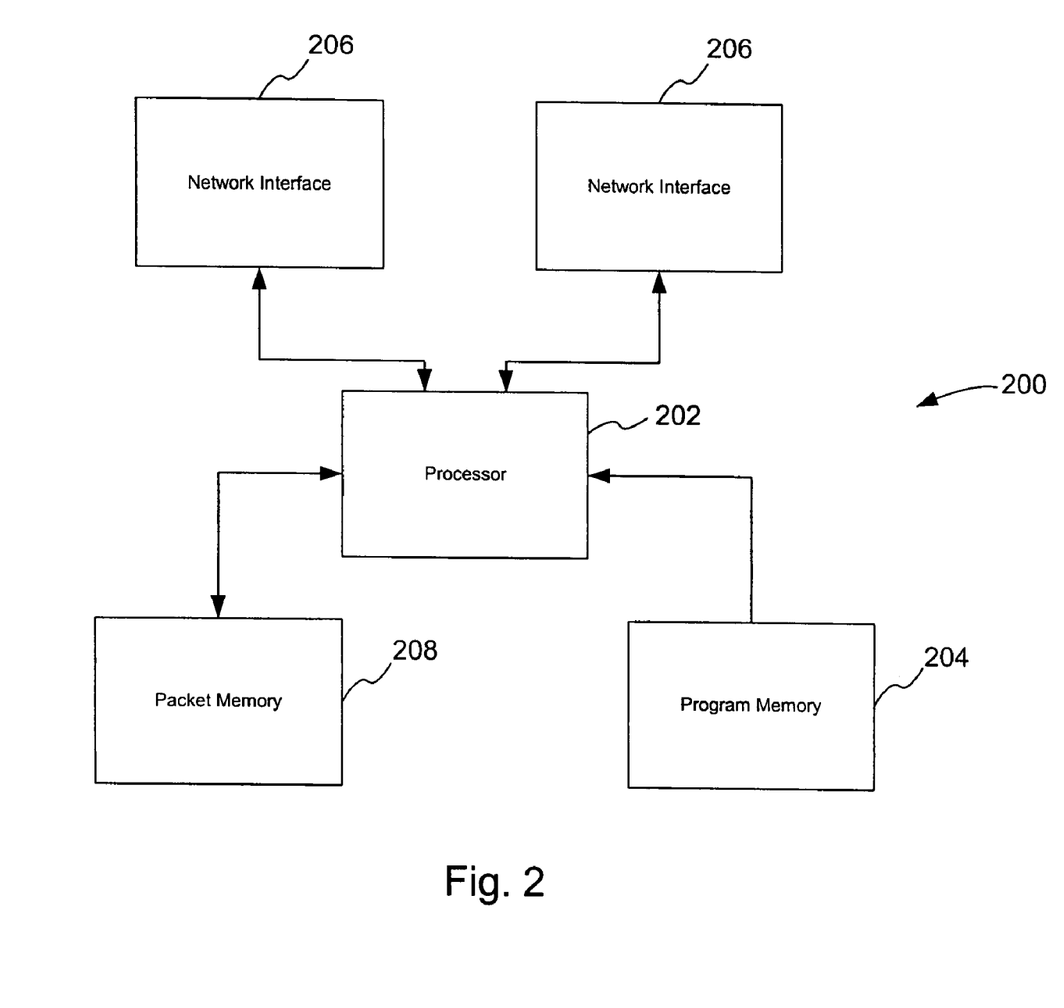
FIG. 2 depicts hardware usable for implementing one embodiment of the present invention.

FIG. 2 depicts a network processing system 200 that can be used to implement any of the elements depicted in FIG. 1 or individual nodes of Frame Relay network 108. In one embodiment, network processing system 200 is a programmable machine that may be implemented in hardware, software, or any combination thereof. A processor 202 executes codes stored in a program memory 204. Program memory 204 is one example of a computer readable storage medium. Program memory 204 can be a volatile memory. Another form of computer-readable storage medium storing the same codes would be some type of non-volatile storage such as floppy disks, CD ROMs, DVD ROMs, hard disks, flash memory, etc. A carrier wave that carries the code across a network is another example of a computer-readable storage medium.

Network processing system 200 interfaces with physical media via a plurality of network interfaces 206. For example, one of network interfaces 206 may couple to a point to multipoint network such as a data over cable network or wireless network. Alternatively, one of network interfaces 206 may couple to a point to point link that carries Frame Relay traffic. Other examples of network interfaces include Ethernet interfaces, DSL interfaces, Token Ring interfaces, Fast Ethernet interfaces, Gigabit Ethernet interfaces, ATM interfaces, HSSI interfaces, POS interfaces, FDDI interfaces, etc. As packets are received, processed, and forwarded by network processor system 200, they are stored in a packet memory 208.

Network processing system 200 may be an Internet Protocol router and may include an operating system such as the Internetwork Operating System (IOS®) of Cisco Systems, Inc. and any appropriate application software. In one embodiment, central access point 104 is implemented as a router of the UBR7200 series available from Cisco Systems. Also, one or more of subscriber units 106 can be implemented as a 3600 series or 2600 series router, also both available from Cisco Systems. The architecture depicted in FIG. 2 is merely representative.

Figure 3:
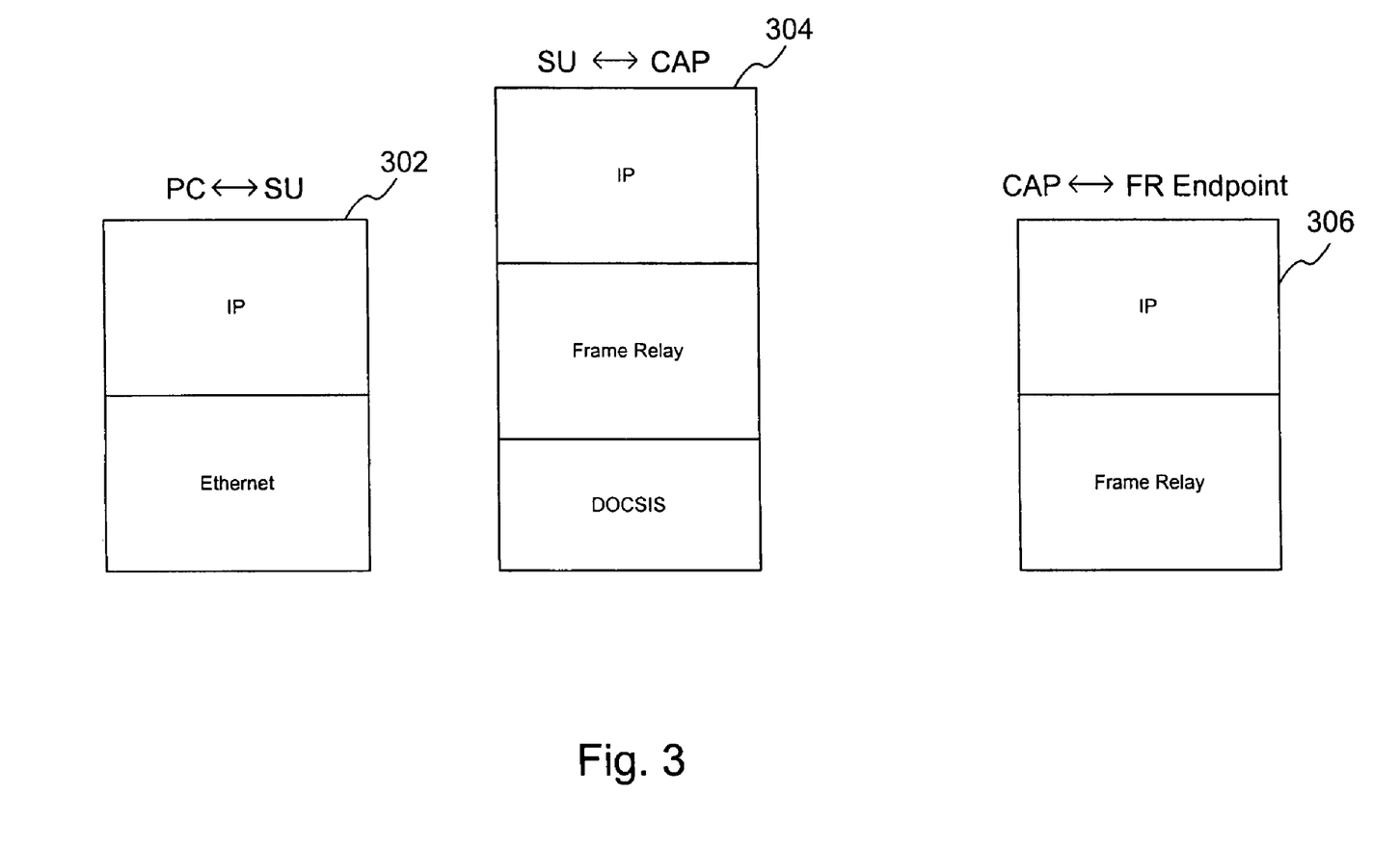
FIG. 3 depicts protocol stacks used to implement Frame Relay services across a point to multipoint network according to one embodiment of the present invention.

FIG. 3 depicts protocol stacks used for communication among the various elements depicted in FIG. 1. The stacks in FIG. 3 assume that Frame Relay connectivity is used to transfer IP packets. In this way, internet services such as web browsing and email can be provided by the Frame Relay connectivity that it is implemented over the point to multipoint network. A first protocol stack 302 is used for communication between subscriber unit 106 and a personal computer or other customer premise equipment (CPE) located at the subscriber location. Typically, IP packets will be encapsulated within Ethernet frames for communication at the CPE side of the subscriber unit. Therefore, protocol stack 302 shows an IP layer above an Ethernet layer.

A second protocol stack 304 is used for communication between subscriber unit 106 and central access point 104. For communication between subscriber unit 106 and central access point 104, an appropriate point to multipoint protocol is used. Each subscriber unit 106 includes both the Frame Relay client and a DOCSIS client to implement the respective protocols. A modified DOCSIS client or other substitute point to multipoint client may substitute for the DOCSIS client.

Subscriber unit 106 extracts IP frames to be forwarded via Frame Relay services from the Ethernet frames and then encapsulates these IP packets within Frame Relay packets. Subscriber unit 106 then encapsulates the Frame Relay packets within DOCSIS packets.

In one embodiment, encapsulating the Frame Relay packet within a DOCSIS packet includes first encapsulating the Frame Relay packet within an Ethernet packet and then encapsulating the Ethernet packet within the DOCSIS packet. The Ethernet packet structure is exploited because it is recognized as suitable packet content by the existing DOCSIS protocol but there is no invocation of Ethernet protocol software.

Once received at central access point 104, the Frame Relay information is extracted from the DOCSIS or other point to multipoint protocol packets. Thus, protocol stack 304 includes a DOCSIS layer as the lowest layer, a Frame Relay layer above the DOCSIS layer and an IP layer above the DOCSIS layer. Any point to multipoint protocol may substitute for DOCSIS or the physical layer of DOCSIS may be replaced by another point to multipoint protocol or a modified version of DOCSIS.

A third protocol stack 306 shows the interactions between central access point 104 and Frame Relay end point 110 via Frame Relay network 108. Central access point 304 extracts the Frame Relay packet from the DOCSIS packet. The Frame Relay information is then forwarded through Frame Relay network 108 in accordance with Frame Relay protocols. Frame Relay endpoint 110 then retrieve the IP information from the Frame Relay packets. To support this type of communication, central access point 104 and Frame Relay endpoint 110 incorporate protocol stack 306 which includes an IP layer above a Frame Relay layer.

The protocol stacks have been described with reference to generating Frame Relay packets at subscriber unit 106 and forwarding Frame Relay packets to end point 110. It will be appreciated that a reverse process will be followed to transfer Frame Relay information in the other direction. An Internet Protocol packet is encapsulated within a Frame Relay packet at Frame Relay endpoint 110. Frame relay endpoint 110 forwards this packet across Frame Relay network 108 to central access point 104.

Central access point 104 encapsulates the Frame Relay packet within a DOCSIS packet. This DOCSIS packet will then be forwarded to one of subscriber units 106 via point to multipoint network 102. At the particular subscriber unit 106, the Frame Relay packet is extracted from the DOCSIS packet and the IP packet is extracted from the Frame Relay packet. This subscriber unit 106 can then encapsulate the IP packet within an Ethernet packet for forwarding to a collocated CPE device such as a PC.

Figure 4:
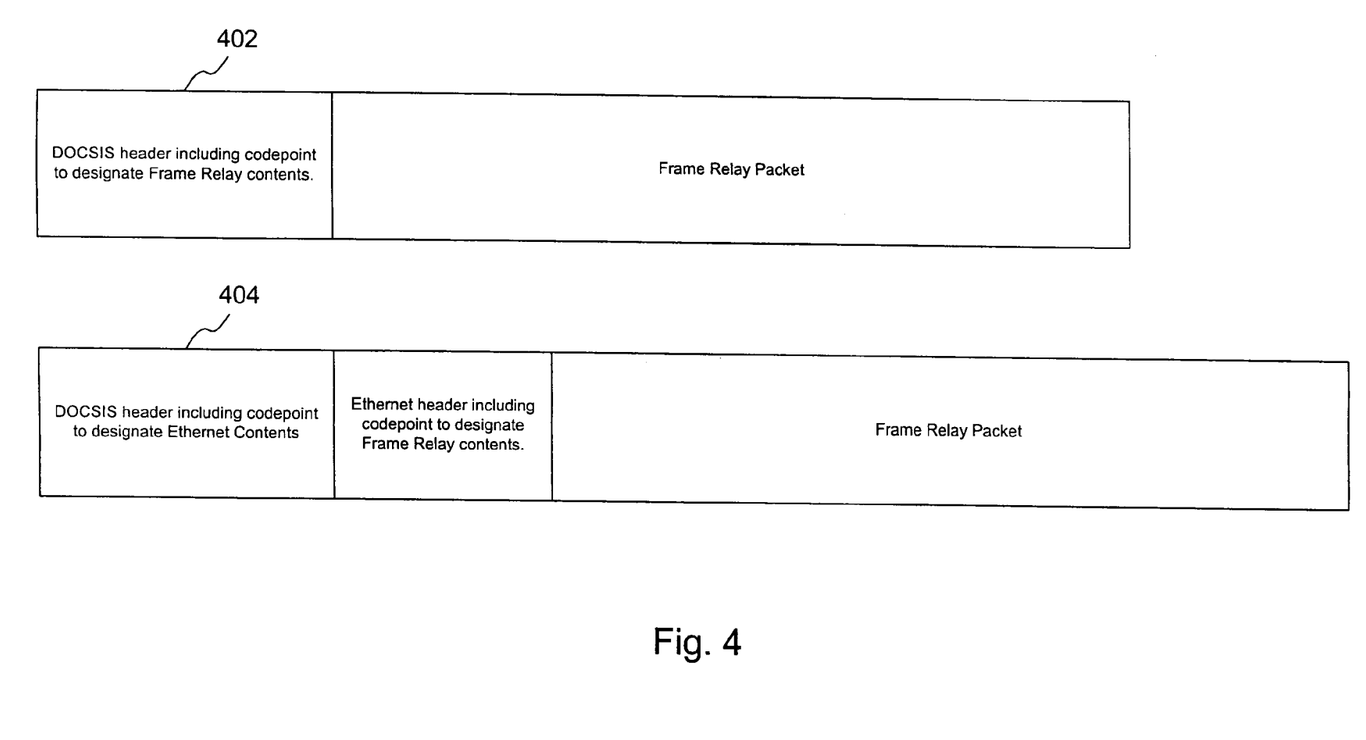
FIG. 4 depicts packet structures for carrying Frame Relay information across a point to multipoint network.

FIG. 4 depicts packet structures used in forwarding Frame Relay information across a point to multipoint network in accordance with one embodiment of the present invention. As has been discussed, in one embodiment, the point to multipoint network of FIG. 1 uses the DOCSIS protocol. The header portion of DOCSIS packets includes a code point that specifies the contents of the packet. In the current version of the DOCSIS specifications, there is no code point that designates Frame Relay contents.

A first packet structure 402 assumes modification of the DOCSIS protocol to allow for a code point that specifies Frame Relay contents. The header includes this code point and the Frame Relay packet is in the payload portion of the DOCSIS packet. A second packet structure 404 requires no such modification to the DOCSIS protocol. In this packet structure, the DOCSIS header includes the code point that designates the DOCSIS packet payload as an ethernet packet. Such a codepoint is already defined in the DOCSIS specifications. The Frame Relay packet is then included within an Ethernet packet where a header of the ethernet packet includes a code point designating the Ethernet packet cargo as being Frame Relay information. This structure requires extra overhead but does not require modification to the DOCSIS protocol. The use of this Ethernet packet is for the purpose of facilitating encapsulation of Frame Relay information and does not imply use of an Ethernet type physical layer or MAC layer in implementing point to multipoint network 102.

Figure 5:
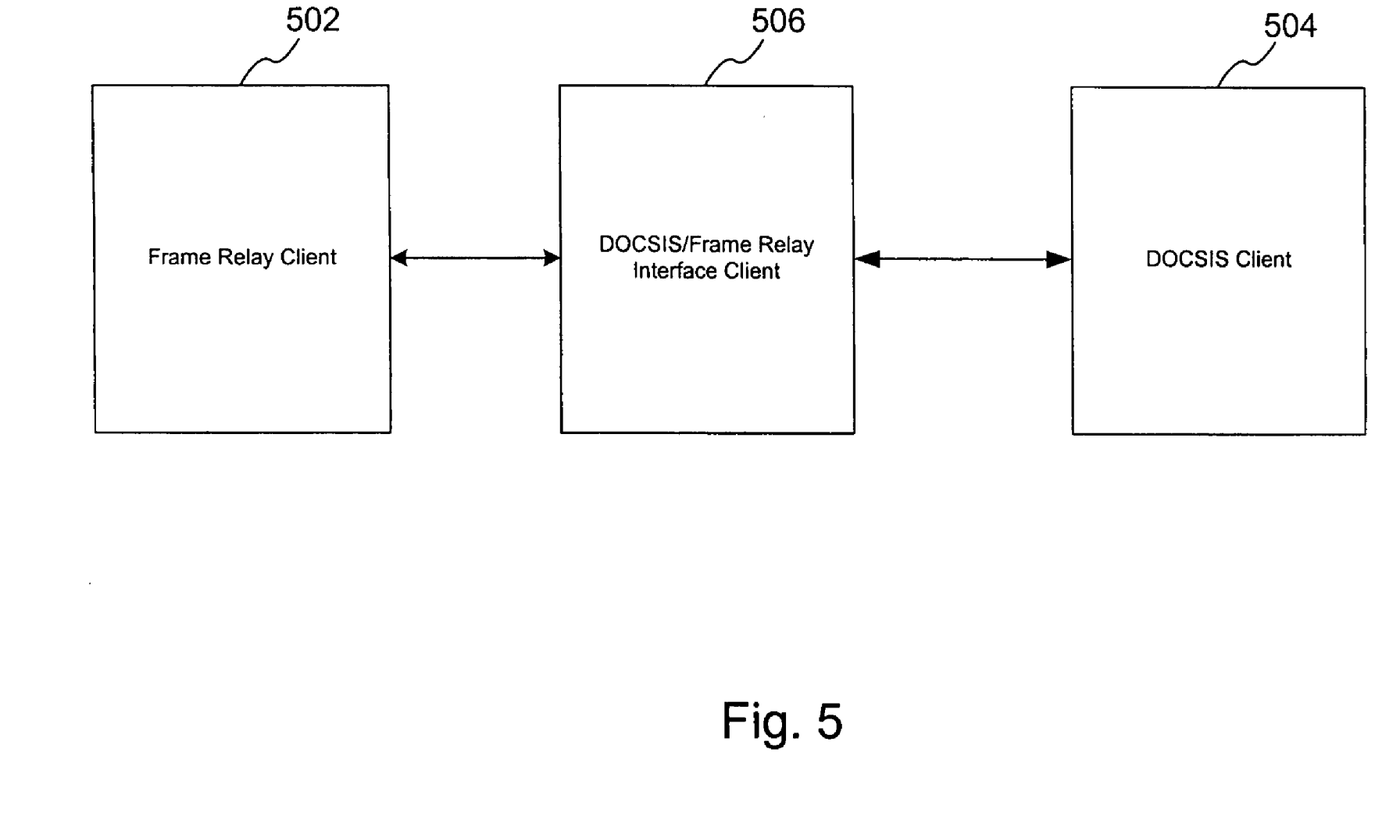
FIG. 5 depicts network protocol clients operating at a central access point of a point to multipoint network.

At both central access point 104 and subscriber unit 106 there is interaction between clients implementing the Frame Relay and point to multipoint protocols. FIG. 5 shows the interaction among these clients in accordance with one embodiment of the present invention. A Frame Relay client 502 interacts with a DOCSIS client 504 via DOCSIS/Frame Relay interface client 506. Interface client 506 performs encapsulation and de-encapsulation as described above to support carrying Frame Relay information across point to multipoint network 102. The clients of FIG. 5 may be installed in a DOCSIS network interface at either central access point 104 or subscriber unit 106.

Furthermore, at central access point 104, interface client 506 assures that Frame Relay quality of service requirements are implemented through point to multipoint network 102. The quality of Frame Relay service given to a particular subscriber is governed by a service level agreement (SLA) between the subscriber and the Frame Relay service provider. According to one embodiment of the present invention, such service level agreements may be maintained with users of subscriber units 106.

A level of service guaranteed to a particular subscriber is defined by various parameters of a so-called "virtual circuit" between the subscriber and a representative Frame Relay endpoint such as Frame Relay endpoint 110. A virtual circuit is a two-way defined data path between two nodes of a Frame Relay network. In the context of the system of FIG. 1, a virtual circuit may, e.g., interconnect one of subscriber units 106 and frame relay end point 110. A frame relay packet to be sent along the virtual circuit is identified by a data link connection identifier (DLCI) in the packet header. Frame relay switching devices use the DLCI to determine where to forward individual packets.

There are various virtual circuit parameters that are used to manage quality of service and define the obligations of the Frame Relay service provider. One such parameter is the committed information rate (CIR). The CIR is the average information carrying capacity of the virtual circuit in bits per second. The CIR is averaged over a time interval having duration $T_c$. Another parameter, the committed burst size, $B_c$, is a measure of the maximum amount of data in bits that the service provider commits to transfer during any interval of duration $T_c$. Another parameter, excess burst size $B_e$, represents the maximum amount of data in bits in excess in excess of $B_c$ that a Frame Relay network can attempt to deliver during duration $T_c$. Data in excess of $B_c$ but below $B_e$ may be discarded if no capacity is available.

Before creating or modifying a virtual circuit that traverses point to multipoint network 102, interface client 506 assures that the Frame Relay traffic parameters of the new or modified virtual circuit can be accommodated within the available DOCSIS bandwidth. Interface client 506 assesses the impact of a new or modified virtual circuit by computing the values of DOCSIS traffic parameters that would result from the aggregate of all virtual circuits making use of a DOCSIS connection. DOCSIS manages upstream (subscriber unit to central access point) traffic separately from downstream (central access point to subscriber unit) so the impact of Frame Relay traffic modification on both directions is considered.

Upstream DOCSIS traffic parameters are computed for each DOCSIS subscriber identifier (SID). There may be multiple SIDs per subscriber unit. The available DOCSIS bandwidth for a given SID is determined by DOCSIS committed information rate ($CIR_{DOCSIS}$), peak rate DOCSIS traffic (peakrateupstream$_{DOCSIS}$) and a maximum DOCSIS burst size (burst$_{DOCSIS}$). The $CIR_{DOCSIS}$ value represents the average number of bits per unit time $T_{c\text{-}DOCSIS}$ that can travel between a given subscriber unit 106 and central access point 104 via point to multipoint network 102. The peakrateupstream$_{DOCSIS}$ value indicates the maximum information rate that point to multipoint network 102 will attempt to provide upstream for a given SID. The burst$_{DOCSIS}$ value is a measure of the amount of data in excess of the $CIR_{DOCSIS}$ value that point to multipoint network 102 will provide for a given subscriber unit 106.

For downstream DOCSIS traffic, there is only one relevant traffic parameter, peakratedownstream$_{DOCSIS}$. This is for the cumulative downstream traffic handled by a given head end DOCSIS network interface. The upstream and downstream DOCSIS parameters are maintained by a DOCSIS bandwidth manager within DOCSIS client 504.

Figure 6:
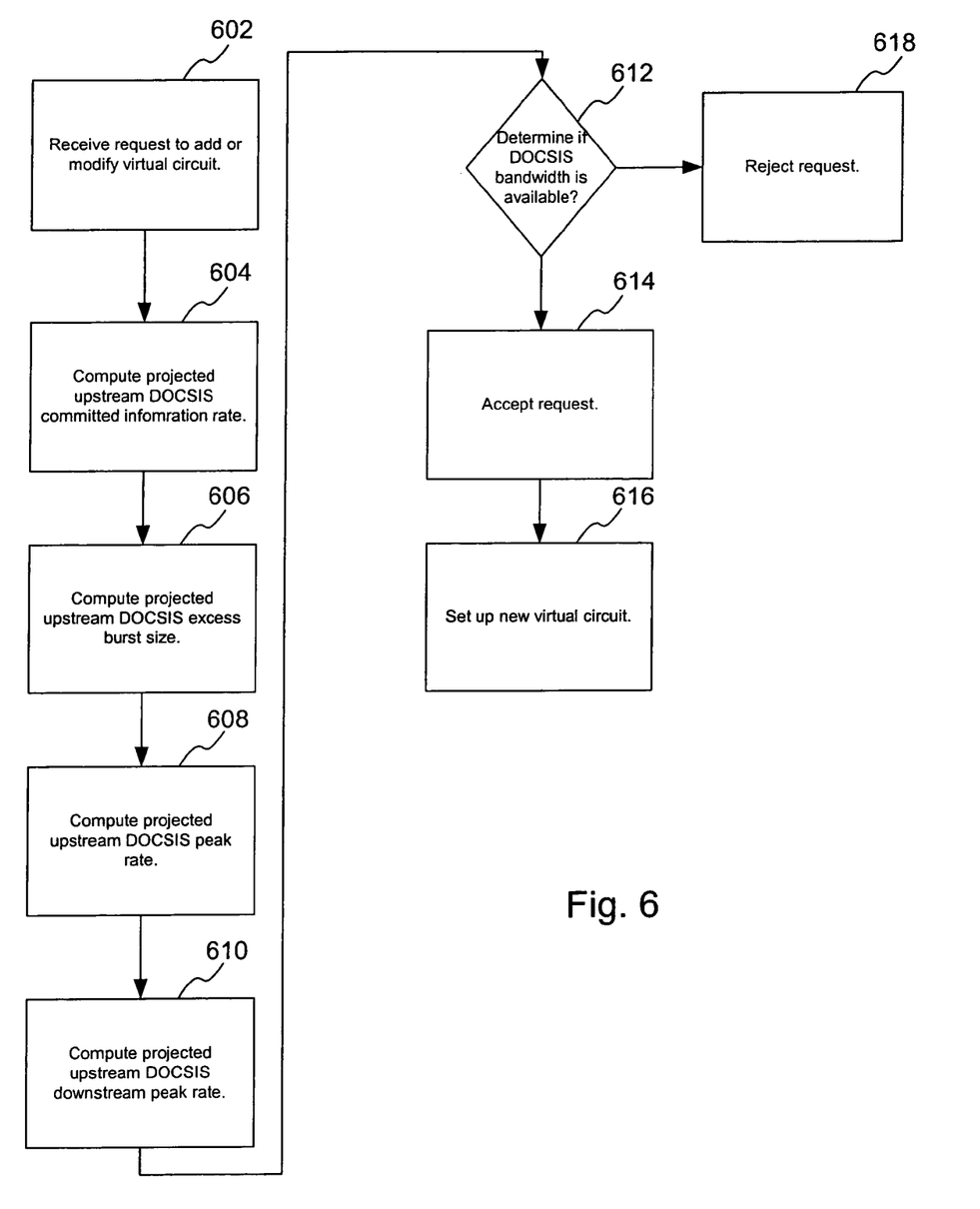
FIG. 6 is a flowchart describing steps of creating or modifying a Frame Relay virtual circuit through a point to multipoint network.

FIG. 6 is a flow chart describing steps performed by interface client 506 at central access point 104 in adding or modifying a virtual circuit that will traverse point to multipoint network 102. At step 602, interface client 506 receives a request to add or modify a Frame Relay virtual circuit and adjust DOCSIS quality of service parameters accordingly. The request includes the Frame Relay CIR, $T_c$ and $B_e$ values. The parameter $B_c$ is by definition equivalent to $T_c$/CIR. Interface client 506 determines the impact on the available DOCSIS bandwidth between central access point 104 and subscriber unit 106. When a virtual circuit is either created or modified, the DOCSIS bandwidth manager first checks if it is possible to accommodate the extra bandwidth required by the virtual circuit and then allocate the necessary bandwidth if it is in fact available.

At step 604, interface client 506 determines the DOCSIS upstream committed information rate, $CIR_{DOCSIS}$ that would result from fulfilling the request of step 602. This is computed by $$CIR_{DOCSIS} = \sum_{dlci}(CIR)$$

which sums the committed information rates of the all the virtual circuits carried over a given DOCSIS SID including the one to be created or modified. Then at step 606, Frame Relay interface client 506 computes the projected DOCSIS upstream excess burst size, burst$_{DOCSIS}$ according to $$\text{Burst}_{DOCSIS} = \sum_{dlci}\left(\frac{b_e}{T_c}\right).$$

This formula sums all of the Frame Relay virtual circuit excess burst sizes for a given SID. Then at step 608, the DOCSIS upstream peakrate is computed as peakrateupstream$_{DOCSIS}$=CIR$_{DOCSIS}$+Burst$_{DOCSIS}$. This completes the computations for the upstream DOCSIS bandwidth.

The only computation for the downstream DOCSIS bandwidth is peakratedownstream$_{DOCSIS}$=CIR$_{DOCSIS}$+Burst$_{DOCSIS}$. This computation totals all of the Frame Relay virtual circuits managed through a given DOCSIS network interface at the head end.

After step 610, interface client 506 has a complete picture of the DOCSIS bandwidth management impact of the requested virtual circuit creation or modification. At step 612, interface client 506 determines if the necessary DOCSIS bandwidth is available by passing the computed DOCSIS bandwidth parameters to the bandwidth manager within DOCSIS client 504. If the DOCSIS bandwidth approves these new DOCSIS management parameters, the bandwidth is available.

If the bandwidth is available, interface client 506 accepts the request of step 602 at step 614 by sending a request acknowledgement to Frame Relay client 502 and notifying DOCSIS client 504 that the new bandwidth will in fact be used. The bandwidth manager within DOCSIS client 504 updates the various DOCSIS traffic management parameters appropriately. At step 616, Frame Relay client 502 sets up the new virtual circuit that traverses point to multipoint network 102. On the other hand, if step 612 determines that insufficient DOCSIS bandwidth is available, then interface client 506 rejects the request and notifies Frame Relay client 502 accordingly at step 618.

It is understood that the examples and embodiments described herein are for illustrative purposes only and that various modifications and changes in light thereof will be apparent to persons skilled in the art and are to be included within the spirit and purview of this application and the scope of the appended claims and their full scope of equivalents.

What is claimed is:

1. A method of providing Frame Relay services via a point to multipoint network comprising at least one subscriber node and a central access node in communication therewith using a multipoint protocol, the method comprising:
generating a Frame Relay packet at said subscriber node of said point to multipoint network;
encapsulating said Frame Relay packet within a point to multipoint protocol packet at said subscriber node; and
forwarding said point to multipoint protocol packet including said encapsulated Frame Relay packet from said subscriber node to said central access node of said point to multipoint network, said central access node in communication with a Frame Relay network.

2. The method of claim 1 wherein said point to multipoint network comprises a data over cable network.

3. The method of claim 1 wherein said point to multipoint network comprises a wireless network.

4. The method of claim 1 wherein said point to multipoint protocol packet comprises a DOCSIS packet.

5. The method of claim 4 wherein a header of said DOCSIS packet identifies contents of said DOCSIS packet as Frame Relay information.

6. The method of claim 1 wherein encapsulating said Frame Relay packet within a point to multipoint protocol packet comprises:
encapsulating said Frame Relay packet within an Ethernet packet; and
encapsulating said Ethernet packet within a point to multipoint packet.

7. The method of claim 1 wherein the point to multipoint network comprises a plurality of said subscriber nodes in communication with the central access node.

8. The method of claim 1 wherein the central access node is in communication with a frame relay network having a frame relay endpoint.

9. The method of claim 1 further comprising creating a virtual circuit between said subscriber node and a frame relay endpoint.

10. The method of claim 1 wherein the Frame Relay packet comprises a DLCI in a header of said Frame Relay packet.

11. A method of providing Frame Relay services via a point to multipoint network comprising at least one subscriber node and a central access node in communication therewith using a multipoint protocol, the method comprising:
receiving a point to multipoint protocol packet at said central access node of said point to multipoint network, said point to multipoint protocol packet having a Frame Relay packet encapsulated therein;
extracting the Frame Relay packet from said point to multipoint protocol packet at said central access node; and
forwarding said Frame Relay packet from said central access node via a Frame Relay network.

12. The method of claim 11 wherein said point to multipoint network comprises a data over cable network.

13. The method of claim 11 wherein said point to multipoint network comprises a wireless network.

14. The method of claim 11 wherein said point to multipoint protocol packet comprises a DOCSIS packet.

15. The method of claim 14 wherein a header of said DOCSIS packet identifies contents of said DOCSIS packet as Frame Relay information.

16. The method of claim 14 further comprising computing DOCSIS traffic parameters.

17. The method of claim 16 further comprising checking that the computed parameters can be accommodated within available DOCSIS bandwidth.

18. The method of claim 16 wherein computing DOCSIS traffic parameters comprises computing traffic parameters for multiple DOCSIS subscriber identifiers.

19. The method of claim 16 wherein computing DOCSIS traffic parameters comprises computing traffic parameters for upstream and downstream traffic.

20. The method of claim 11 further comprising receiving a request to add or modify a Frame Relay virtual circuit.

21. The method of claim 20 further comprising calculating a committed information rate and a burst size for upstream traffic.

22. The method of claim 20 further comprising calculating a downstream peak rate.

23. The method of claim 20 further comprising accepting said request if sufficient bandwidth is available and rejecting the request if insufficient bandwidth is available.

24. A computer program product for providing Frame Relay services via a point to multipoint network comprising at least one subscriber node and a central access node in communication therewith using a multipoint protocol, the computer program product comprising:
  code that generates a Frame Relay packet at said subscriber node of said point to multipoint network;
  code that encapsulates said Frame Relay packet within a point to multipoint protocol packet at said subscriber node;
  code that forwards said point to multipoint protocol packet including said encapsulated Frame Relay packet from said subscriber node to said central access node of said point to multipoint network, said central access node in communication with a Frame Relay network; and
  a computer-readable storage medium for storing the codes executable by a processor.

25. The product of claim 24 wherein said point to multipoint network comprises a data over cable network.

26. The product of claim 24 wherein said point to multipoint network comprises a wireless network.

27. The product of claim 24 wherein said point to multipoint protocol packet comprises a DOCSIS packet.

28. The product of claim 27 wherein a header of said DOCSIS packet identifies contents of said DOCSIS packet as Frame Relay information.

29. The product of claim 24 wherein said code that encapsulates said Frame Relay packet within a point to multipoint protocol packet comprises:
  code that encapsulates said Frame Relay packet within an Ethernet packet; and
  code that encapsulates said Ethernet packet within a point to multipoint packet.

30. A computer program product for providing Frame Relay services via a point to multipoint network comprising at least one subscriber node and a central access node in communication therewith using a multipoint protocol, said product comprising:
  code that receives a point to multipoint protocol packet at said central access node of said point to multipoint network, said point to multipoint protocol packet having a Frame Relay packet encapsulated therein;
  code that extracts the Frame Relay packet from said point to multipoint protocol packet at said central access node;
  code that forwards said Frame Relay packet from said central access node via a Frame Relay network; and
  a computer-readable storage medium for storing the codes executable by a processor.

31. The product of claim 30 wherein said point to multipoint network comprises a data over cable network.

32. The product of claim 30 wherein said point to multipoint network comprises a wireless network.

33. The product of claim 30 wherein said point to multipoint protocol packet comprises a DOCSIS packet.

34. The product of claim 33 wherein a header of said DOCSIS packet identifies contents of said DOCSIS packet as Frame Relay information.

35. Apparatus for providing Frame Relay services via a point to multipoint network comprising at least one subscriber node and a central access node in communication therewith using a multipoint protocol, said apparatus comprising:
  a processor that executes software; and
  a computer readable storage medium that stores said software, said software comprising:
    code that generates a Frame Relay packet at said subscriber node of said point to multipoint network;
    code that encapsulates said Frame Relay packet within a point to multipoint protocol packet at said subscriber node; and
    code that forwards said point to multipoint protocol packet including said encapsulated Frame Relay packet from said subscriber node to said central access node of said point to multipoint network, said central access node in communication with a Frame Relay network.

36. Apparatus for providing Frame Relay services via a point to multipoint network comprising at least one subscriber node and a central access node in communication therewith using a multipoint protocol, said apparatus comprising:
  means for generating a Frame Relay packet at said subscriber node of said point to multipoint network;
  means for encapsulating said Frame Relay packet within a point to multipoint protocol packet at said subscriber node; and
  means for forwarding said point to multipoint protocol packet from said subscriber node to said central access node of said point to multipoint network, said central access node in communication with a Frame Relay network.

37. Apparatus for providing Frame Relay services via a point to multipoint network comprising at least one subscriber node and a central access node in communication therewith using a multipoint protocol, said apparatus comprising:
  a processor that executes software;
  a computer-readable storage medium that stores said software, said software comprising:
    code that receives a point to multipoint protocol packet at said central access node of said point to multipoint network, said point to multipoint protocol packet having a Frame Relay packet encapsulated therein;
    code that extracts the Frame Relay packet from said point to multipoint protocol packet at said central access node; and
    code that forwards said Frame Relay packet from said central access node via a Frame Relay network.

38. Apparatus for providing Frame Relay services via a point to multipoint network comprising at least one subscriber node and a central access node in communication therewith using a multipoint protocol, said apparatus comprising:
  means for receiving a point to multipoint protocol packet at said central access node of said point to multipoint network, said point to multipoint protocol packet having a Frame Relay packet encapsulated therein;
  means for extracting a Frame Relay packet from said point to multipoint protocol packet at said central access node; and
  means for forwarding said Frame Relay packet from said central access node via a Frame Relay network.

* * * * *